United States Patent Office 3,469,859
Patented Sept. 30, 1969

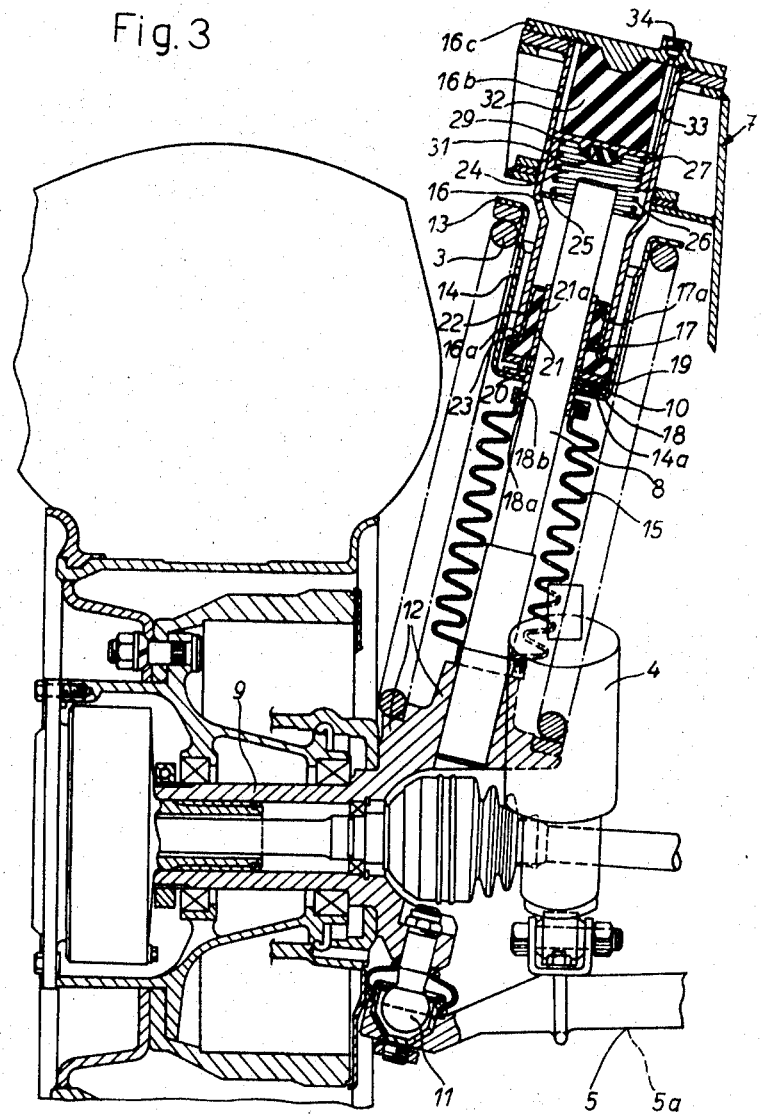

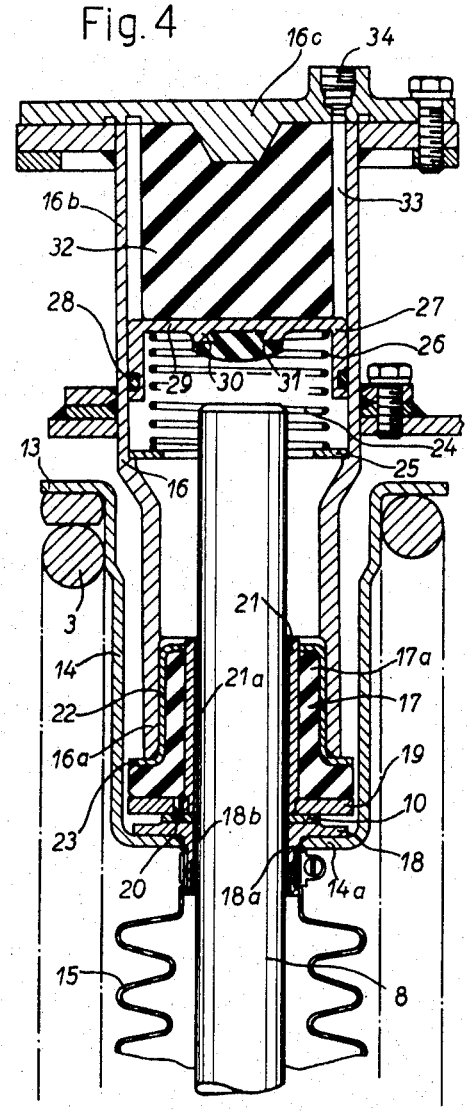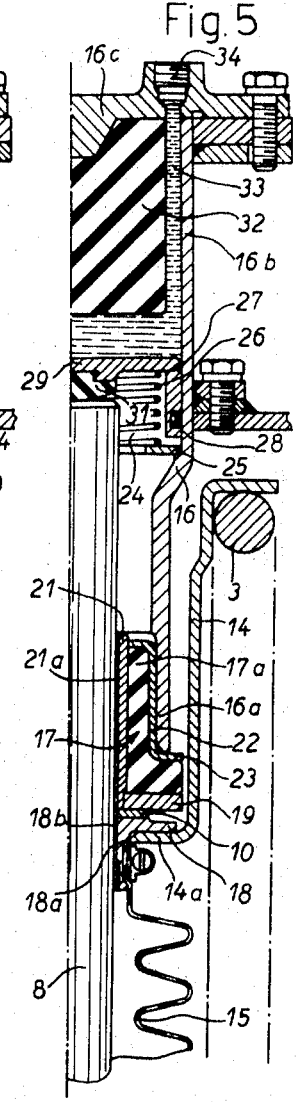

3,469,859
MOTOR VEHICLE SUSPENSIONS
Dante Giacosa, Turin, Italy, assignor to Fiat Societa per Azioni, Turin, Italy
Filed Dec. 5, 1967, Ser. No. 688,064
Claims priority, application Italy, Dec. 9, 1966, 56,386
Int. Cl. B60g 5/00, 11/00
U.S. Cl. 280—96.2                        12 Claims

ABSTRACT OF THE DISCLOSURE

A vehicle suspension has a helical spring and a pressure operated piston at one end of the spring which is operative to engage a rigid support rod fast with the other end of the spring to lock the suspension when required.

---

This invention relates to motor vehicle suspensions, and more particularly but not exclusively to suspensions for armoured gun-carrying vehicles.

In armoured vehicles having gun mountings it is important, in order to obtain a high accuracy of fire, to support the vehicle rigidly on the ground during firing, to prevent oscillation of the gun mounting. When the body of the vehicle is supported on wheels by resilient suspensions, rigid support for firing is conventionally provided by employing retractable legs onto which the weight of the vehicle is transferred during firing operations.

Such retractable legs, in addition to complicating the construction of the vehicle, are relatively difficult to operate, and, more importantly, the extension of the legs into their operative positions takes a time which is not always available when the vehicle goes into action. Furthermore, such legs fail to ensure full stability of the vehicle under all conditions of the ground on which the vehicle is operating.

A main object of this invention is to obviate the above drawbacks by providing a vehicle suspension device which can be locked to provide a rigid support, for example during firing of a gun mounted on the vehicle, relieving the suspension from the weight of the vehicle without utilizing any external retractable supports to engage the ground.

A further object of the invention is to provide a suspension device of the abovementioned type which is simple and inexpensive in construction, and which can be locked and unlocked conveniently and quickly.

With the above objects in view the invention provides a vehicle suspension device including a helical spring adapted to bear at its lower end on vehicle wheel support structure and connected at its upper to a bearing part adapted to support a vehicle body, and a rigid support member attached to said support structure and having normally a pre-determined clearance from the bearing part, characterised by a fluid pressure-operated piston movable within a cylinder provided on the bearing part said piston being normally clear of engagement with the rigid support member to permit normal suspension by the helical spring, and supply of pressure fluid to the cylinder urging the piston into engagement with said rigid support member to lock the suspension device.

The invention will be further understood from the following detailed description, given by way of non-limiting example, referring to the accompanying drawings, wherein:

FIGURE 3 is a part-sectional front elevational view on an enlarged scale of one suspension device of the vehicle, according to a preferred embodiment of the invention;

FIGURE 4 is an enlarged axial sectional view of the top portion of the suspension device of FIGURE 3, shown in its normal, unlocked, state, and FIGURE 5 is a view similar to that of FIGURE 4 showing the suspension device in its locked state, one-half only of the device being shown in this figure.

Figure 1:
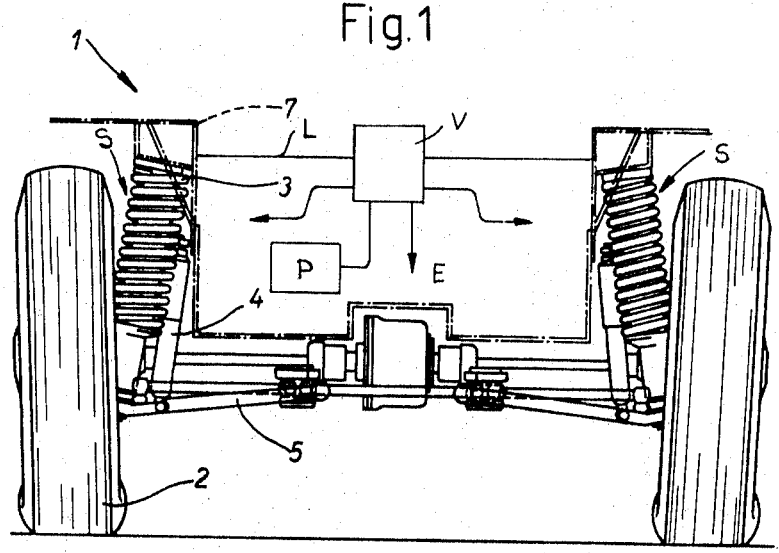
FIGURE 1 is a diagrammatical elevational front view of parts of an armoured vehicle provided with suspension devices according to the invention.
Figure 2:
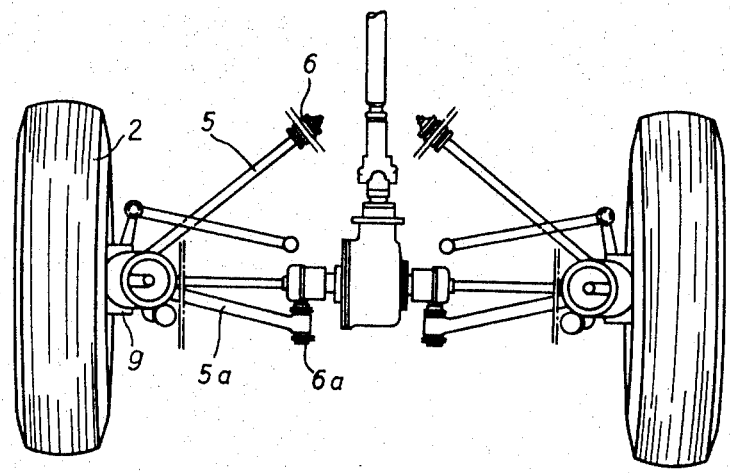
FIGURE 2 is a plan view of the parts shown in FIGURE 1.

In the drawings, 1 generally denotes part of the frame of an armoured motor vehicle of the type having four driving and steering wheels 2, two only of which are shown in FIGURES 1 and 2. Each wheel 2 supports a body 7 of the vehicle through a respective suspension device S including a helical spring 3 which is spanned by an hydraulic shock absorber 4 in a conventional manner.

The wheels 2 have swivelable bearing housings 9 each of which is connected to a respective pair of swing arms 5, 5a articulated to the housing 9 at a ball joint 11 (FIGURE 3). The swing arms 5, 5a are arranged in a diverging relationship, the ends of the swing arms 5, 5a remote from the respective ball joint 11 being connected in a manner known per se at 6 and 6a to the vehicle frame 1.

Each helical suspension spring 3 bears at its lower end on a bearing projection 12 (FIGURE 3) formed on the housing 9. The spring 3 surrounds coaxially a rigid rod 8 which is fast with the housing 9 and which acts as a guide for vertical oscillations and angular displacements of the wheel 2 with respect to the body 7.

An intermediate cup-shaped bearing member 14 is disposed within the upper end of the spring 3, the member 14 having an outwardly projecting flange 13 at its upper end which bears on the upper end of the spring 3, and an inwardly projecting flange 14a at its lower end (FIGURE 4). A bushing 18 has a tubular extension 18a passing through the central bore of the flange 14a and having secured thereto a deformable bellows 15 which surrounds the rod 8 to protect the latter against dust, water and mud. The bushing 18, together with its tubular extension 18a, has a low-friction lining 18b permitting relative sliding movement on the rod 8, the latter acting as a guide for such movement.

A flange 19 provided at the lower end of a resilient tubular bearing member 17 bears through the interposition of an annular step bearing plate 10 on the bushing 18 carried by the cup-shaped member 14. The bearing plate 10 is secured to the flange 19 by a dowel 20. The tubular member 17 is secured to the lower end of a sleeve 16 which is rigidly connected to the body 7 and which is co-axially arranged between the upper end of the rod 8 and the cup-shaped member 14.

The tubular member 17 serves to transmit the weight of the vehicle to the spring 3 through the member 14. The member 17 comprises a body 17a of resilient material pre-stressed between an inner cylindrical sleeve 21 and an outer flanged sleeve 22, both of metal. The outer sleeve 22 has an outwardly projecting flange 23 at its lower end on which a lower cylindrical portion 16a of the sleeve 16 rests. The inner metal sleeve 21 has on its internal surface a low-friction lining 21a in sliding contact with the rod 8.

The step bearing plate 10 allows the unit comprising the spring 3, the cup-shaped member 14 and the bushing 18 to rotate with respect to the tubular member 17 and sleeve 16 during steering movement of the respective wheel 2.

The sleeve 16 has an upper cylindrical portion 16b of larger diameter than the lower portion 16a, the portion 16b acting as a fluid pressure cylinder. To this end the cylindrical portion 16b is closed at its upper end by a fluid-tight sealing over 16c connected to the body 7, and at its lower end by a piston 27 which is slidable within the cylindrical portion 16b. The piston 27 is resiliently urged upwardly by a helical spring 26 coaxially arranged with the piston, the spring 26 bearing at its lower end on an annular bearing plate 25 seated on an internal annular projection on the sleeve 16, and bearing at its upper end on the bottom wall 29 of the piston 27. The piston 27 is provided with a sealing ring 28 which makes a fluid-tight seal with the internal surface of the cylindrical portion 16b.

The bottom wall 29 of the piston has a shaped projection 30 incorporating a resiliently yieldable stop member 31 adapted to engage the end of the rigid rod 8 and to transmit loads therefrom to a resilient block 32 in order to limit oscillations of the suspension in normal, unlocked, operation thereof.

The block 32, which is cylindrical and which is made of resiliently yieldable material, is arranged within the cylindrical portion 16b and engages the cover 16c centrally. The outer diameter of the block 32 is smaller than the internal bore of the cylindrical portion 16b so as to define an annular clearance space 33 in the portion 16b. A fluid pressure inlet 34 communicates with the space 33. A respective fluid pressure line L (shown diagrammatically in FIGURE 1) is connected to the inlet 34 and leads to a pressure fluid source P through a control valve device V. When pressure fluid is supplied to the inlet 34 the piston 27 is forced downwardly to bear on the end of the rod 8 and lock the suspension. The lines L of each suspension device S are connected through the same control valve device V so that locking and unlocking of all the suspension devices S can be effected simultaneously.

The suspension devices S operate as follows. Under normal driving conditions of the vehicle the control valve device V is disposed in a position in which it connects all the lines L to an exhaust outlet E, so that each piston 27 is urged by the respective spring 26 against the resilient block 32, maintaining a clearance between the end of the rod 8 and the piston. The suspension devices are therefore unlocked, and operate normally, transmitting the weight of the vehicle body 7 to the wheels 2 through the springs 3 (FIGURES 3 and 4).

When it becomes necessary to lock the suspension devices S in order to effect firing of a gun mounted on the vehicle, the valve device V is moved to admit pressure fluid to each clearance space 33 in order to urge the respective piston 27 downwardly so that the respective stop member 31 contacts the upper end of the respective rod 8. The vehicle body 7 is supported directly by the rigid rods 8, relieving the springs 3, so that the suspension devices S are rigidly locked (FIGURE 5). The vehicle then has a transverse and longitudinal stability which is comparable with that which would be afforded by supporting the vehicle directly on the ground by rigid legs.

It will be seen that the locking and unlocking of the suspension devices according to the present invention is effected quickly, so that the vehicle can be promptly transferred from its normal driving condition to its firing condition and vice-versa.

A further advantage deriving from the use of vehicle suspension device according to the invention is that the device can be used to vary the height of the vehicle body above the ground, whereby obstacles can be cleared which would otherwise impede the progress of the vehicle with its suspension in its normal state.

What I claim is:
1. A vehicle suspension device comprising in combination: a helical spring adapted to bear at its lower end on vehicle wheel support structure; a bearing part adapted to support a vehicle body, the upper end of the spring being connected to said bearing part; a rigid support member fast with respect to the lower end of the spring and having normally a predetermined clearance from the bearing part; a fluid-pressure cylinder provided on the bearing part; a piston movable within said cylnder; means maintaining said piston normally clear of engagement with the rigid support member to permit normal suspension by the helical spring, and means for supplying pressure fluid to the cylinder to urge the piston into engagement with said rigid support member to lock the suspension device.

2. A suspension device as claimed in claim 1 wherein the rigid support member comprises a rod arranged coaxially within the helical spring.

3. A suspension device as claimed in claim 2 in combination with a swivelable bearing housing for a steerable vehicle wheel, the helical spring bearing at its lower end on said housing.

4. A suspension device as claimed in claim 3 including a cylindrical sleeve which is slidable on and rotatable about the upper end of the rigid support rod, the sleeve incorporating said cylinder at its upper end and said sleeve being connected to the upper end of the spring.

5. A suspension device as claimed in claim 4 including a cup-shaped bearing member against which the upper end of the spring bears and which in turn bears against said sleeve.

6. A suspension device as claimed in claim 5 wherein a resilient tubular bearing member is interposed between said cup-shaped bearing member and said sleeve.

7. A suspension device as claimed in claim 1 wherein the piston is normally held out of engagement with the rigid support member by resilient return means.

8. A suspension device as claimed in claim 1 including a block of resiliently yieldable material disposed in the cylinder and opposing displacement of the piston upon engagement thereof by the rigid support member in normal operation of the suspension, the piston being spaced from the block when pressure fluid is supplied to the cylinder.

9. A suspension device as claimed in claim 8 wherein the block is mounted centrally in the cylinder, defining an annular clearance space between the block and the cylinder wall, said pressure fluid supply means being connected to said clearance space.

10. A suspension device as claimed in claim 1 wherein said means for supplying pressure fluid to the fluid pressure cylinder includes a source of pressure fluid, a line connecting the source to the cylinder, and a control device in said line controlling the fluid pressure in the cylinder.

11. A wheeled vehicle having a body and respective suspension devices supporting the body from each respective wheel, each wheel having a bearing housing, and each suspension device comprising in combination: a helical spring bearing at its lower end on the respective wheel bearing housing; a bearing part connected to the upper end of the spring and bearing against the vehicle body; a rigid support member secured to the wheel bearing housing and having normally a predetermined clearance from the bearing part; a fluid-pressure cylinder provided on the bearing part; a piston movable within said cylinder; means maintaining said piston normally clear of engagement with the rigid support member to permit normal suspension by the helical spring, and means for supplying pressure fluid to the cylinder to urge the piston into engagement with said rigid support member to lock the suspension device.

12. A vehicle as claimed in claim 11 including a pressure fluid source connected to the cylinders of the suspension devices through a common control device, whereby all the suspension devices are lockable and unlockable simultaneously.

References Cited

UNITED STATES PATENTS

| | | | |
|---|---|---|---|
| 1,310,146 | 7/1919 | Schneider. | |
| 2,650,108 | 8/1953 | Bruce | 267—34 |
| 2,916,296 | 12/1959 | Muller | 280—124 |
| 3,033,590 | 5/1962 | Statler | 280—124 |
| 3,068,022 | 12/1962 | Fiala | 280—124 |
| 3,390,892 | 7/1968 | Van Winsen et al. | 280—6.1 |
| 3,414,278 | 12/1968 | Schmid | 267—34 |

KENNETH H. BETTS, Primary Examiner

U.S. Cl. X.R.

267—34; 280—124